US009033837B2

(12) United States Patent
Smetana et al.

(10) Patent No.: US 9,033,837 B2
(45) Date of Patent: May 19, 2015

(54) PLANETARY GEAR FOR TRANSMITTING A DRIVING TORQUE IN A VEHICLE, AND DRIVE UNIT COMPRISING THE PLANETARY GEAR

(75) Inventors: Tomas Smetana, Herzogenaurach (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 164 days.

(21) Appl. No.: 13/820,195

(22) PCT Filed: Jul. 14, 2011

(86) PCT No.: PCT/EP2011/062072
§ 371 (c)(1),
(2), (4) Date: Mar. 22, 2013

(87) PCT Pub. No.: WO2012/028373
PCT Pub. Date: Mar. 8, 2012

(65) Prior Publication Data
US 2013/0172142 A1    Jul. 4, 2013

(30) Foreign Application Priority Data
Sep. 3, 2010 (DE) .......................... 10 2010 036 243

(51) Int. Cl.
*F16H 1/36* (2006.01)
*F16H 48/11* (2012.01)
*F16H 48/36* (2012.01)

(52) U.S. Cl.
CPC .................. *F16H 1/36* (2013.01); *F16H 48/11* (2013.01); *F16H 48/36* (2013.01); *F16H 2048/364* (2013.01); *F16H 2200/0021* (2013.01)

(58) Field of Classification Search
USPC ........... 475/5, 6, 10, 149–151, 220, 221, 225, 475/248, 252, 253, 332, 339
See application file for complete search history.

(56) References Cited

U.S. PATENT DOCUMENTS

| 4,779,487 | A | * | 10/1988 | Pitsch et al. | 475/221 |
|---|---|---|---|---|---|
| 5,080,641 | A | * | 1/1992 | Kobayashi | 475/221 |
| 5,205,797 | A | * | 4/1993 | Kobayashi et al. | 475/221 |
| 5,330,395 | A | * | 7/1994 | Ra et al. | 475/150 |
| 5,458,547 | A | | 10/1995 | Teraoka et al. | |
| 5,472,387 | A | * | 12/1995 | Kamlukin | 475/339 |
| 5,624,346 | A | | 4/1997 | Hirota et al. | |
| 5,839,985 | A | * | 11/1998 | Teraoka | 475/249 |
| 5,916,054 | A | * | 6/1999 | Kobayashi | 475/220 |
| 6,120,407 | A | * | 9/2000 | Mimura | 475/225 |

(Continued)

FOREIGN PATENT DOCUMENTS

DE 102007040475 3/2009
JP 5071096 11/2012

*Primary Examiner* — Jacob S Scott
(74) *Attorney, Agent, or Firm* — Davidson, Davidson & Kappel, LLC

(57) ABSTRACT

A planetary gear and a drive unit having the planetary gear, the planetary gear being characterized by very good integratability. For this purpose, a planetary gear (5) for transmitting a drive torque in a vehicle is proposed, having a first sun wheel attachment (12a) and a second sun wheel attachment (12b), each of the sun wheel attachments (12a, b) being coupled to a shaft (2a, b) in a rotationally fixed manner, and the sun wheel attachments (12a, b) being rotatable relative to one another, and the sun wheel attachments (12a, b) being situated in an overlapping area (11), overlapping in the radial direction.

10 Claims, 4 Drawing Sheets

(56) References Cited

U.S. PATENT DOCUMENTS 6,461,265 B1 * 10/2002 Graham et al. ............... 475/5
6,916,265 B2 * 7/2005 Imamura ..................... 475/339
7,651,425 B2 * 1/2010 Shimizu ......................... 475/5
2004/0192485 A1 * 9/2004 Severinsson ................ 475/149

* cited by examiner

PLANETARY GEAR FOR TRANSMITTING A DRIVING TORQUE IN A VEHICLE, AND DRIVE UNIT COMPRISING THE PLANETARY GEAR

The present invention relates to a planetary gear for transmitting a drive torque in a vehicle, having a first sun wheel attachment and a second sun wheel attachment, each of the sun wheel attachments being coupled to a shaft in a rotationally fixed manner, and the sun wheel attachments being rotatable relative to one another. Moreover, the present invention relates to a drive unit having the planetary gear.

BACKGROUND

Planetary gears are often used in differentials for transmitting drive torques in vehicles. The planetary gear may be used in various specific embodiments, for example in distribution differentials or in axle differentials.

These types of planetary gears usually have at least one sun wheel, and multiple planet wheels which mesh with the sun wheel and which are rotatably supported in a planet carrier via pins. The planet carrier may likewise in turn be coupled to a gearwheel in a rotationally fixed manner. In known designs, differentials have two coupled planetary gear sets, whereby, for example, a drive torque is introduced via a sum shaft and distributed over two differential shafts, each differential shaft being coupled to a sun wheel of one of the planetary gear sets. These types of differentials based on planetary gears are characterized in particular by a compact design.

The publication DE 10 2007 040 475 A1, which likely constitutes the most proximate prior art, relates to a spur gear differential, in particular for motor vehicles, having a drive element which is connected to a planet carrier in a rotationally fixed manner, at least one pair of intermeshing planet wheels being rotatably mounted in the planet carrier, and each of the planet wheels meshing with one toothed driven gear. In the figures, the driven gears are practically mirror-symmetrical with respect to one another relative to a radial plane.

SUMMARY OF THE INVENTION

It is an object of the present invention to provide a planetary gear and a drive unit having the planetary gear, the planetary gear being characterized by very good integratability.

The present invention provides a planetary gear which is suitable and/or designed for transmitting a drive torque in a drive train of a vehicle. The drive torque is conducted, in particular by an engine, to wheels of the vehicle, with the planetary gear connected in between. In particular, the planetary gear is designed as a differential, for example as an axle differential or a distribution differential, in particular as a spur gear differential. As an axle differential, the planetary gear distributes the drive torque to two axles of the vehicle, and as a distribution differential, the planetary gear distributes the drive torque to two wheels of one axle of the vehicle.

The planetary gear includes a first and a second sun wheel attachment, each sun wheel attachment being coupled to a shaft in a rotationally fixed manner. The sun wheel attachments and/or the shafts are mounted so that they are rotatable relative to one another. In particular, the shafts are designed as differential shafts in the planetary gear, which conduct the drive torque of a sum shaft, for example, from the planetary gear. The sun wheel attachments preferably include a gearwheel area which in particular has a spur gearing.

Within the scope of the present invention, it is proposed that the sun wheel attachments are situated in an overlap area, overlapping in the radial direction, in particular with respect to at least one, preferably both, shafts. Thus, if a vector which radially projects from the rotational axis formed by the shaft(s) is viewed, this vector initially passes through one sun wheel attachment and then through the other sun wheel attachment.

The present invention is based on the consideration that additional degrees of freedom with regard to the positioning of the gearwheel areas of the sun wheel attachments are obtained due to the overlapping design of the sun wheel attachments. Thus, it is possible in particular to shift the position of the gearwheel areas of the sun wheel attachments in the axial direction during construction, and thus adapt to the needs of an installation situation. Integration of the planetary gear into an assembly is thus simplified.

In one preferred refinement of the present invention, the overlap area is designed as a supporting area in which the sun wheel attachments are supported in the radial direction via a radial bearing or via a friction area. Thus, one of the sun wheel attachments is supported on the other in the radial direction. This support in the radial direction has a guiding function for the planetary gear, in particular in the design as a differential. Thus, for example, it is conceivable that shifting or tilting of the shafts which occurs due to stresses may be compensated for by the coupling of the sun wheel attachments. A more stable operating performance of the planetary gear may be achieved in this way.

The sun wheel attachments are particularly preferably supported with respect to one another via a radial bearing which may be designed, for example, as a sliding bearing or also as any desired roller bearing, in particular as a needle bearing. In other specific embodiments it is possible for the sun wheel attachments to be mutually supported via a friction area which in a targeted manner causes increased friction between the sun wheel attachments, and thus between the shafts, in order to brake a relative rotation of the two shafts with respect to one another.

The sun wheel attachments particularly preferably have running surfaces in the overlap area which are situated coaxially and concentrically with respect to one another. In particular, the running surfaces are designed in the form of straight hollow cylinders. In a first specific embodiment, the running surfaces themselves form the sliding bearing, and are designed to roll over one another in direct contact. In another specific embodiment, a component, for example a sliding device, in particular a slide bush, or a rolling element device, in particular a cage or a sleeve having rolling elements, in particular needles, is situated in between. While the specific embodiment in which the sun wheel attachments roll directly over one another via the running surfaces is characterized by a reduced number of components, the specific embodiments in which a component is introduced in between have advantages with regard to installation or service life.

In one possible design of a specific embodiment of the present invention, each of the sun wheel attachments has an attachment area for the rotationally fixed mounting or bearing on the associated shaft, and has the gearwheel area. In particular, the attachment area and the gearwheel area are designed in one piece. The rotationally fixed mounting may be achieved, for example, by a form fit in the direction of rotation, the attachment area having grooves which, for example, are oriented in the axial direction and open radially inwardly, so that the attachment area for the rotationally fixed mounting is pushed onto the associated shaft which is complementary to the attachment area, and is secured in the direction of rotation in a form-locked manner.

In the design implementation, it is preferred that at least one of the gearwheel areas protrudes in the axial direction relative to its attachment area. For example, the sun wheel attachment has an offset design in a longitudinal section of the rotational axis of the shafts. Together with the gearwheel area which is shifted in the axial direction, the sun wheel attachment protrudes beyond the attachment area of the other sun wheel attachment. It is particularly preferred that the protruding gearwheel area overlaps the attachment area of the other gearwheel attachment, forming the overlap area and/or the supporting area. In this specific embodiment, it is possible for the gearwheel areas of the two sun wheel attachments to be very close to one another in the axial direction, but, viewed from the axial position, not to be symmetrically or centrally situated, but, rather, to be asymmetrically shifted in the direction of the one sun wheel attachment. It is thus possible to avoid interfering contours in the integration of the planetary gears for one or both of the gearwheel areas. The optional mutual radial support is particularly advantageous, since this ensures that the structure is not mechanically unstable.

With the aim of further increasing the mechanical stability and/or rigidity, it is preferred that at least one axial bearing is provided via which the sun wheel attachments are mutually supported. For example, an axial ring which rolls off on both sun wheel attachments is situated between the sun wheel attachments. Alternatively or additionally, the sun wheel attachments are supported with respect to a stop which is fixed to the housing, in particular with respect to the housing itself, or a differential cage. Here as well, it is conceivable to provide an axial ring. Instead of an axial ring, it is possible to position sliding disks between the bearing partners.

Thus, in a combined specific embodiment of the present invention, each sun wheel attachment is triply supported, namely, a first time in the axial direction with respect to a stop which is fixed to the housing, in particular with respect to the housing itself, or the differential cage, a second time, likewise in the axial direction, with respect to the other sun wheel attachment, and a third time in the radial direction relative to the other sun wheel attachment. As a result of this triple bearing of the sun wheel attachment, which is designed in particular as a driven sun wheel, very high mechanical rigidity is achieved.

The planetary gear according to the present invention may particularly preferably be used when the planetary gear additionally includes two planet wheel sets, the first planet wheel set meshing with one sun wheel attachment, and the second planet wheel set meshing with the other sun wheel attachment, and the planets of the first planet wheel set meshing with the planets of the second planet wheel set. In this configuration, for design reasons it is advantageous to position the gearwheel sections of the sun wheel attachments as close as possible to one another in the axial direction, this close arrangement being achievable in a particularly simple manner due to the implementation according to the present invention.

The further subject matter of the present invention relates to a drive unit for a vehicle, characterized by a planetary gear. The drive unit has at least one electric motor for providing the drive torque. The planetary gear is preferably designed as a distribution gear, the drive torque of the electric motor being coupled via a sum shaft, and supplied via the sun wheel attachments and the shafts as differential shafts. To achieve a particularly compact design, the electric motor is preferably situated coaxially with respect to the shafts. In particular, the main shaft of the electric motor is situated coaxially with respect to at least one of the shafts. In particular, the main shaft is implemented as a hollow shaft which coaxially and/or concentrically encloses the at least one shaft.

In one possible refinement of the present invention, the drive unit includes a superposition gear and an additional electric motor, the superposition gear and/or the additional electric motor being situated coaxially with respect to at least one of the shafts. For this purpose, the superposition gear is designed to, in addition to the drive torque, selectively apply an additional torque to either one shaft or the other shaft, or to both shafts. In particular, the main shaft of the additional electric motor is situated coaxially with respect to at least one of the shafts. In particular, the main shaft is implemented as a hollow shaft which coaxially and/or concentrically encloses the at least one shaft.

This results in a possible design which in the axial direction has the first electric motor initially, then the distribution gear designed as the planetary gear, followed by the superposition gear, and lastly, the additional electric motor, all mentioned components being situated coaxially with respect to the shafts, resulting in a very compact design overall.

BRIEF DESCRIPTION OF THE DRAWINGS

Further features, advantages, and effects of the present invention result from the following description of one preferred exemplary embodiment of the present invention.

DETAILED DESCRIPTION

Figure 1:
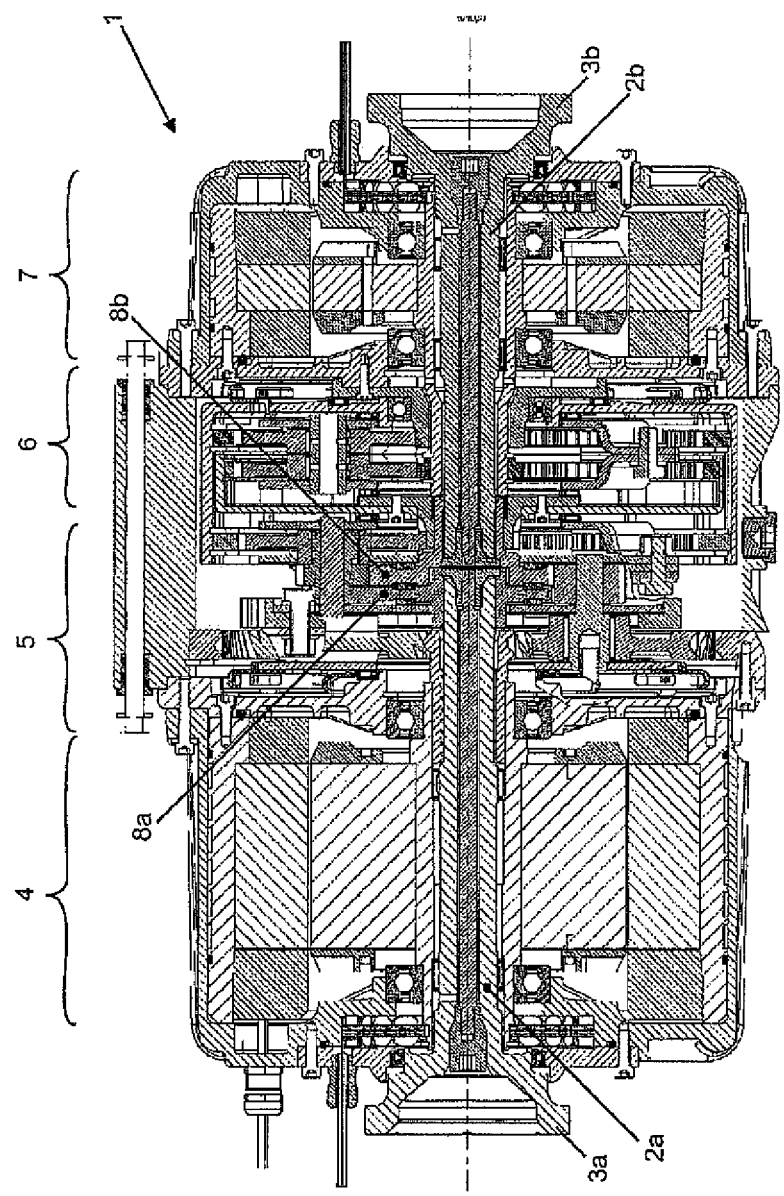
FIG. 1 shows a schematic longitudinal section of a drive unit as a first exemplary embodiment of the present invention.

FIG. 1 shows a schematic cross-sectional illustration of a drive unit 1 which may be used, for example, for driving a vehicle. As outputs, drive unit 1 has two differential shafts 2a, b which at their ends are provided with domes 3a, b in order to be articulatedly coupled to shafts of drive wheels of a vehicle. However, in a similar specific embodiment a drive unit 1 may be achieved which provides a drive torque for a front axle area and a rear axle area via the two differential shafts 2a, b.

In the axial direction, drive unit 1 is divided into a first electric motor 4 which provides the main drive torque for differential shafts 2a, b, a distribution gear 5 which distributes the main drive torque of electric motor 4 to the two differential shafts 2a, b, a superposition gear 6, and a second electric motor 7, the superposition gear being designed to superimpose the drive torque of electric motor 7 onto the main torque and selectively transmit same to both differential shafts 2a, b, or, when the vehicle negotiates curves, for example, to one of differential shafts 2a or 2b. Electric motor 4, distribution gear 5, superposition gear 6, and electric motor 7 are each situated coaxially and concentrically with respect to differential shafts 2a, b, resulting in an extremely compact design overall which has an axial length of less than 65 cm, for example, and a diameter of less than 35 cm.

Distribution gear 5 is designed as a planetary gear having two coupled planetary gear sets, a sun wheel 8a and 8b being associated with differential shaft 2a and 2b, respectively.

Figure 2:
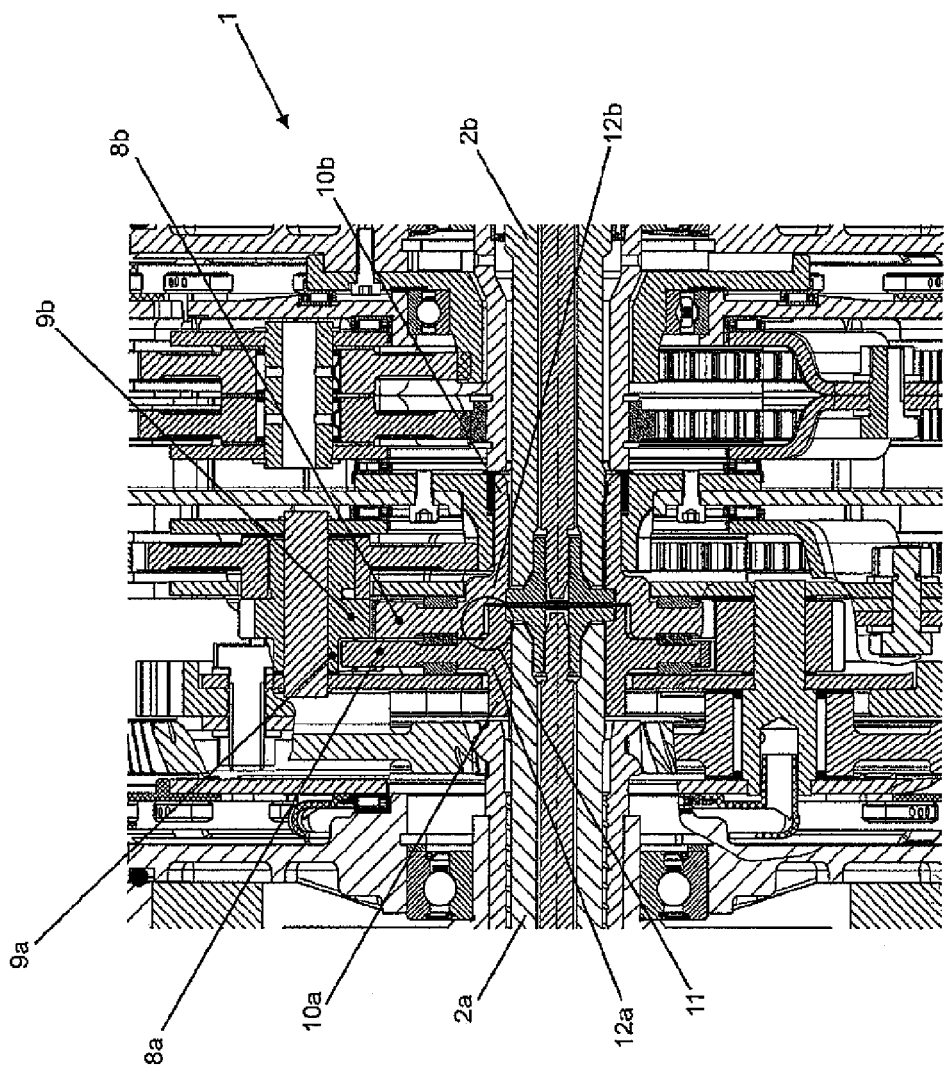
FIG. 2 shows, in the same illustration as FIG. 1, a detail enlargement in the area of the sun wheel attachments.

FIG. 2 illustrates a detail enlargement of drive unit 1 in the area of sun wheels 8a and b. It is apparent from this illustration that sun wheels 8a, b have different diameters, and in each case mesh with a planetary gear set 9a, b associated with the sun wheels. With regard to the configuration of planetary gear sets 9a, b, reference is made to the schematic three-dimensional illustration in FIG. 4.

Figure 4:
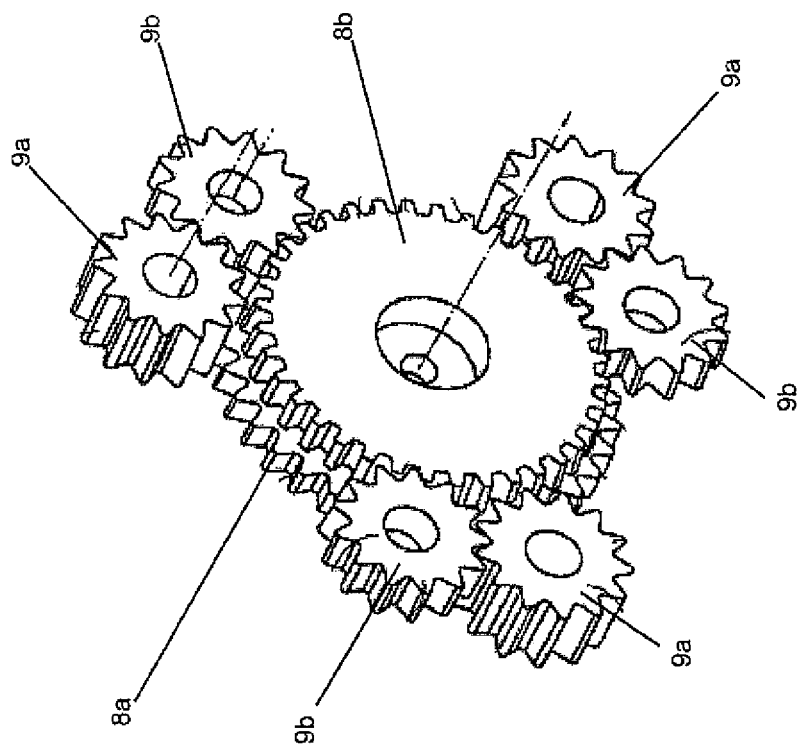
FIG. 4 shows a schematic three-dimensional illustration of the sun wheels together with the meshing planets.

FIG. 4 shows a schematic three-dimensional illustration of only the association of sun wheels 8a, b relative to the two planetary gear sets 9a, b, as a function diagram. It is apparent that sun wheel 8a and 8b in each case mesh with an associated planetary gear set 9a and 9b. In addition, the planets of planetary gear sets 9a, b mesh with one another. This very specific configuration is easily achievable when sun wheels 8a, b are very close to one another in the axial direction.

To achieve the smallest possible distance between sun wheels 8a, b, sun wheels 8a, b are mounted on an attachment area 10a and 10b, respectively, as is apparent from FIG. 2, for example, so that a sun wheel support or attachment 12a and a sun wheel support or attachment 12b, respectively, are formed. While sun wheel 8a, viewed in the axial direction, is mounted centrally or symmetrically on attachment area 10a, sun wheel 8b is shifted in the axial direction relative to its attachment area 10b, so that, in the longitudinal section shown, sun wheel 8b is situated in an offset extension of attachment area 10b. Sun wheel 8a and attachment area 10a, and sun wheel 8b and attachment area 10b, are in each case designed as one piece. By axially shifting sun wheel 8b relative to its attachment area 10b, in the radial direction with respect to the rotational axis of differential shafts 2a, b, sun wheel 8b is situated in an overlap area 11, overlapping with attachment area 10a of sun wheel 8a. It is also emphasized in particular that, with respect to the parting plane between differential shafts 2a, b, the two sun wheels 8a, b are distinctly asymmetrical, namely, shifted to the left, in the axial direction. Thus, sun wheels 8a, b are situated almost completely in the axial area of differential shaft 2a. As a result of the offset or cup-shaped design of sun wheel attachment 12b which is formed from sun wheel 8b and attachment area 10b, a very tight axial position between sun wheel 8a and sun wheel 8b is achieved, so that the meshing of the two planet wheel sets 9a, b is easily implementable.

Figure 3:
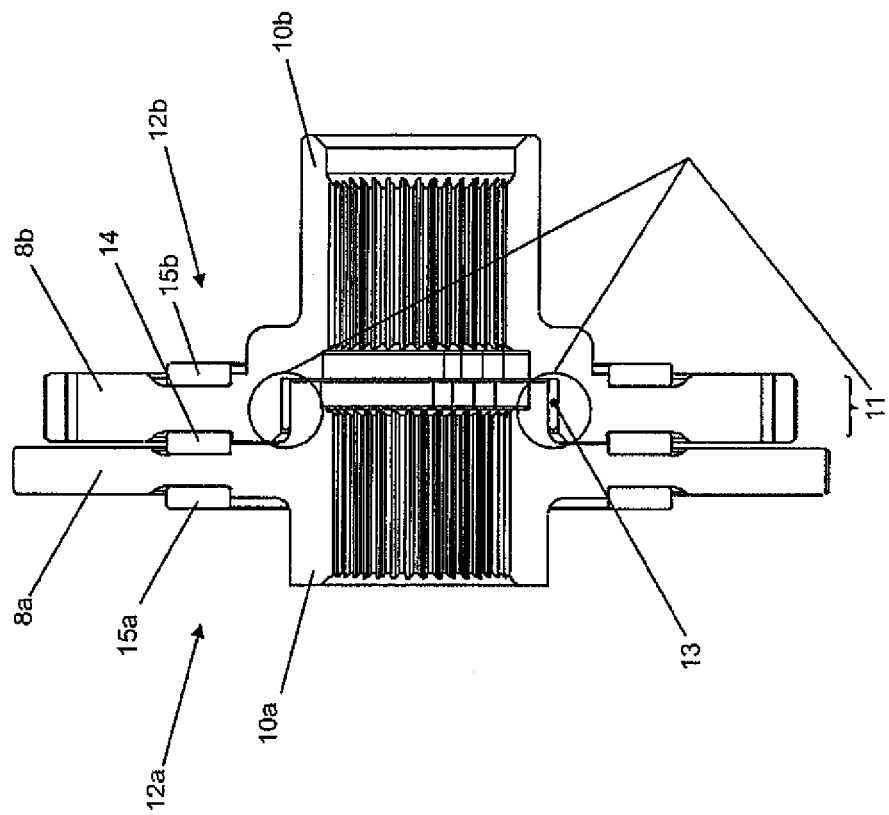
FIG. 3 shows a detail illustration of the two sun wheel attachments in the preceding figures.

FIG. 3 shows a schematic detail enlargement of sun wheel attachments 12a, b from the preceding figures. In this illustration it is apparent that sun wheel attachments 12a, b include attachment area 10a and 10b, respectively, which form a tubular receptacle for differential shafts 2a and 2b, respectively, and which have grooves, extending in the axial direction, for bearing sun wheel attachments 12a and 12b on differential shafts 2a and 2b, respectively, in the direction of rotation in a form-locked manner. Sun wheels 8a, b are integrally formed in one piece with attachment areas 10a, b, respectively, and each has a spur gearing. Sun wheel 8b is offset in the axial direction relative to its attachment area 10b, so that in the radial direction this sun wheel is situated in overlap area 11, overlapping with attachment area 10a of sun wheel attachment 12a.

It is optionally possible to provide a radial bearing 13 in overlap area 11, which may be designed, for example, as a slide bush or also as a roller bearing, in particular as a needle bearing, so that the two sun wheel attachments 12a, b may be mutually supported in the radial direction. However, instead of a radial bearing, a friction area may be provided so that relative twisting of sun wheel attachments 12a, b is allowed, but the sun wheel attachments are braked by friction. In addition to this radial bearing of sun wheel attachments 12a, b with respect to one another, the sun wheel attachments are also supported with respect to one another in the axial direction via an optional axial bearing 14, which may be designed as a sliding disk or as a roller element ring, for example. For radial bearing 13 as well as for axial bearing 14, the running tracks of the bearings are each formed by the surfaces of sun wheel attachments 12a, b.

To further increase the rigidity and the mechanical stability of sun wheel attachments 12a, b during operation, it may optionally be provided that each of sun wheel attachments 12a and 12b is supported in the axial direction with respect to a stop disk or differential cage by a further axial bearing 15a and 15b, respectively. Thus, each of sun wheel attachments 12a, b is triply supported, namely, for sun wheel attachment 12a, via axial bearing 15a, axial bearing 14, and radial bearing 13, and for sun wheel attachment 12b, via axial bearing 15b, axial bearing 14, and radial bearing 13.

Particular advantages of the present invention are the freedom in the configuration of sun wheel attachments 12a, b for differential shafts 2a, b when installation space is limited. In particular due to radial bearing 13, an improved bearing function of sun wheel attachments 12a, b under extreme load is achieved.

LIST OF REFERENCE NUMERALS 1 drive unit
2a, b differential shafts
3a, b domes
4 electric motor
5 distribution gear
6 superposition gear
7 electric motor
8a, b sun wheel
9a, b planet wheel sets
10a, b attachment area
11 overlap area
12a, b sun wheel attachments
13 radial bearing
14 axial bearing
15a, b axial bearing

What is claimed is:

1. A drive unit comprising:
   a planetary gear for transmitting a drive torque in a vehicle; and at least one electric motor for providing the drive torque;
   a superposition gear; and
   an additional electric motor, the superposition gear or the additional electric motor being situated coaxially with respect to the shafts, the planetary gear comprising:
      a first sun wheel device and having a second sun wheel device, each of the first and second sun wheel devices being coupled to a shaft in a rotationally fixed manner, and the first and second sun wheel devices being rotatable relative to one another, the first and second sun wheel devices being situated in an overlapping area so that the first sun wheel device is radially interior or exterior to the second sun wheel device in the overlapping area.

2. The drive unit as recited in claim 1 wherein the overlap area is designed as a supporting area in which the first and second sun wheel devices are supported in the radial direction via a radial bearing or via a friction area.

3. The drive unit as recited in claim 1 wherein the first and second sun wheel devices have running surfaces in the overlap area.

4. The drive unit as recited in claim 3 wherein the running surfaces directly roll over one another as a sliding bearing, or which roll over one another via a component situated in between.

5. The drive unit as recited in claim 4 wherein the component is a sliding device or a roller element device.

6. The drive unit as recited in claim 1 wherein each of the first and second sun wheel devices has an attachment area for a rotationally fixed mounting on the associated shaft, and has a gearwheel area, at least one of the gearwheel areas protruding in the axial direction relative to the attachment area.

7. The drive unit planetary gear as recited in claim 6 wherein the protruding gearwheel area overlaps the attachment area of the other gearwheel attachment forming the overlap area.

8. The drive unit as recited in claim 1 further comprising at least one axial bearing via which the first and second sun wheel devices are mutually supported, and/or via which one of the first and second sun wheel devices are supported with respect to a stop which is fixed to the housing or a differential cage.

9. The drive unit as recited in claim 1 further comprising a first and a second planet wheel set, the first planet wheel set meshing with the first sun wheel device, and the second planet wheel set meshing with the second sun wheel device, and planets of the first planet wheel set meshing with other planets of the second planet wheel set.

10. The drive unit as recited in claim 1 wherein at least one of the electric motor and a main shaft of the electric motor is situated coaxially with respect to the shafts.

\* \* \* \* \*